United States Patent [19]

Bansal

[11] Patent Number: 4,524,081
[45] Date of Patent: Jun. 18, 1985

[54] METHOD FOR MAKING A MARBLED PET FOOD

[75] Inventor: Arun K. Bansal, Hanover Park, Ill.

[73] Assignee: The Quaker Oats Company, Chicago, Ill.

[21] Appl. No.: 549,959

[22] Filed: Nov. 8, 1983

[51] Int. Cl.³ .................... A23P 1/00; A23J 3/00
[52] U.S. Cl. .................... 426/249; 426/250;
426/104; 426/802; 426/805; 426/516; 426/517;
426/518; 264/176 R; 425/376 R
[58] Field of Search ............... 426/249, 250, 802, 104,
426/805 S, 516, 517, 518; 425/376 R, 376 B;
264/211, 75, 274

[56] References Cited

U.S. PATENT DOCUMENTS

| | | | |
|---|---|---|---|
| 2,573,050 | 10/1951 | Orsini | 264/75 |
| 3,014,437 | 12/1961 | Dutchess | 426/565 |
| 3,765,902 | 10/1973 | Charter | 426/249 |
| 3,793,466 | 2/1974 | Hawkins | 426/274 |
| 3,897,572 | 7/1975 | Riggs et al. | 426/805 |
| 3,940,220 | 2/1976 | D'Arcangeli | 264/148 |
| 4,029,823 | 6/1977 | Bone | 426/249 |
| 4,061,789 | 12/1977 | Warren | 426/250 |
| 4,164,385 | 8/1979 | Finkensiep | 264/211 |
| 4,358,468 | 11/1982 | Dolan et al. | 426/802 |
| 4,372,734 | 2/1983 | Dolan et al. | 426/802 |

Primary Examiner—Jeanette Hunter
Attorney, Agent, or Firm—Daniel W. Latham

[57] ABSTRACT

A method and apparatus continuously making a marbled semi-moist or dry pet food, said method comprising the steps of:

(a) merging a red pet food stream with a white pet food stream by advancing the red pet food stream under a first pressure into a conduit having a substantially circular cross-section and advancing the white pet food stream into a plurality of medial locations within said conduit, (b) partially mixing the merged pet food stream by advancing the merged pet food stream through the conduit and through at least one stationary mixing element therein, (c) expressing the partially mixed pet food stream through a shaping die at a second pressure above about 40 psig, and (d) cutting the expressed pet food stream into pet food pieces.

9 Claims, 8 Drawing Figures

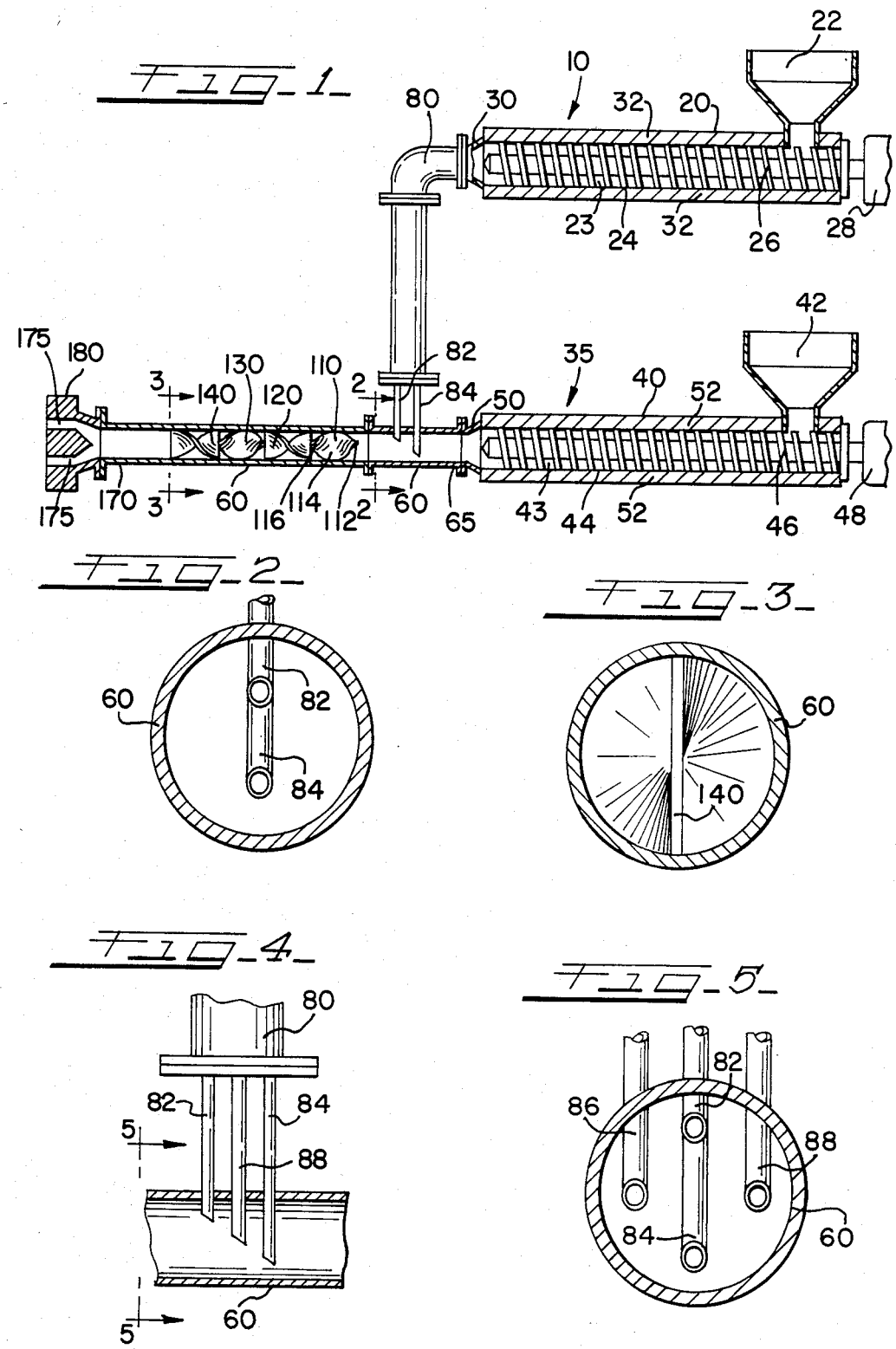

4,524,081

METHOD FOR MAKING A MARBLED PET FOOD

BACKGROUND

In the production of soft pet foods that are semi-moist or dry in moisture content, several methods have been used to make products with the appearance of marbled meat. In a patent issued to Bone, U.S. Pat. No. 3,330,832, a method is disclosed in which a binder of sticky caseinate salt is used to bind extruded sheets of red and white semi-moist pet food into a marbled meat-like loaf. A patent issued to Charter, U.S. Pat. No. 3,765,902, improves on the method of the Bone patent by co-extruding strands of white pet food within the red pet food, but still uses the caseinate salt to bind the two pet foods. Another patent issued to Bone, U.S. Pat. No. 4,029,823, discloses a soft, dry pet food resembling marbled meat in which two pet foods are co-extruded with a proteinaceous adhesive like collagen or a caseinate salt to bind the two pet foods. Although these processes are successful for making marbled pet food products, using caseinate binders is also expensive. It would therefore be desirable to make a less expensive marbled meat-like pet food without caseinate binders.

In U.S. Pat. Nos. 4,358,468 and 4,372,734, Dolan et al have disclosed a process by which a marbled pet food may be produced by applying pressure to bind dissimilar meat and fat phases during partial mixing of the co-extruded phases in a rectangular mixing compartment having stationary mixing elements.

It is therefore an object of the present invention to provide a low-cost semi-moist or dry pet food having the appearance of marbled meat and acceptable palatability to animals.

It is also an object of the present invention to provide a marbled pet food which does not require caseinate binders.

It is also an object of the present invention to provide a method and apparatus for continuously making a caseinate-free marbled meat pet food.

It is also an object of the present invention to provide a method and apparatus capable of making marbled meat pet foods with a variety of marbling patterns.

SUMMARY OF THE INVENTION

These and other objects are accomplished by the method and apparatus of the present invention. I have discovered a method for continuously making a semi-moist or dry pet food comprising the steps of:

(a) merging a red pet food stream with a white pet food stream by (i) advancing the red pet food stream under a first pressure into a conduit having a substantially circular cross section, said first pressure being sufficient to mold the red pet food stream into the shape of the conduit, and (ii) advancing the white pet food stream into a plurality of medial locations within said conduit to combine the white pet food stream with the red pet food stream into a single, merged pet food stream comprising a white pet food disposed within a red pet food at a plurality of medial locations, said merged pet food stream having a substantially circular cross-section;

(b) partially mixing the merged pet food stream by advancing the merged pet food stream through the conduit and through at least one stationary mixing element having means for dividing the merged pet food stream into at least two pet food substreams, said element also having means for partially mixing the respective pet food substreams, and said element also having means for discharging the respective pet food substreams into the conduit in a reconsolidated, partially mixed pet food stream, thereby dividing the merged pet food stream into at least two pet food substreams, partially mixing the respective pet food substreams and discharging the respective pet food substreams into the conduit in a reconsolidated, partially mixed pet food stream;

(c) expressing the reconsolidated, partially mixed pet food stream through a shaping die at a second pressure above about 40 psig; and (d) cutting the expressed pet food stream into pet food pieces.

I have also discovered an apparatus for continuously making a marbled semi-moist or dry pet food comprising:

(a) an elongated conduit having a substantially circular cross section, an upstream end and a downstream end;

(b) means for advancing a red pet food stream under pressure into said upstream end of said conduit;

(c) a plurality of nozzles extending into and terminating medially within said conduit, said nozzles communicating with said conduit;

(d) means for advancing a white pet food stream into said nozzles and through said nozzles to a plurality of medial locations within said conduit;

(e) at least one stationary mixing element within said conduit and downstream from said nozzles, said mixing element having means for dividing a pet food stream into at least two pet food substreams, said element also having means for partially mixing the respective pet food substreams, and said element also having means for discharging the respective pet food substreams into the conduit in a reconsolidated, partially mixed pet food stream;

(f) a shaping die at the downstream end of said conduit, said shaping die having discharge passages communicating with said conduit whereby the reconsolidated, partially mixed pet food is expressed from the conduit; and (g) means for cutting an expressed pet food into pet food pieces.

BRIEF DESCRIPTION OF THE DRAWINGS

FIG. 1 is an elevational, partially sectional view of the apparatus of the invention.

FIG. 2 is a cross-sectional view taken along line 2—2 of FIG. 1.

FIG. 3 is a cross-sectional view taken along the line 3—3 of FIG. 1.

FIG. 4 is an elevational, partially sectional view of an alternative configuration for nozzles within the conduit.

FIG. 5 is a cross-sectional view taken along line 5—5 of FIG. 4.

DETAILED DESCRIPTION OF THE DRAWINGS

Figure 6:
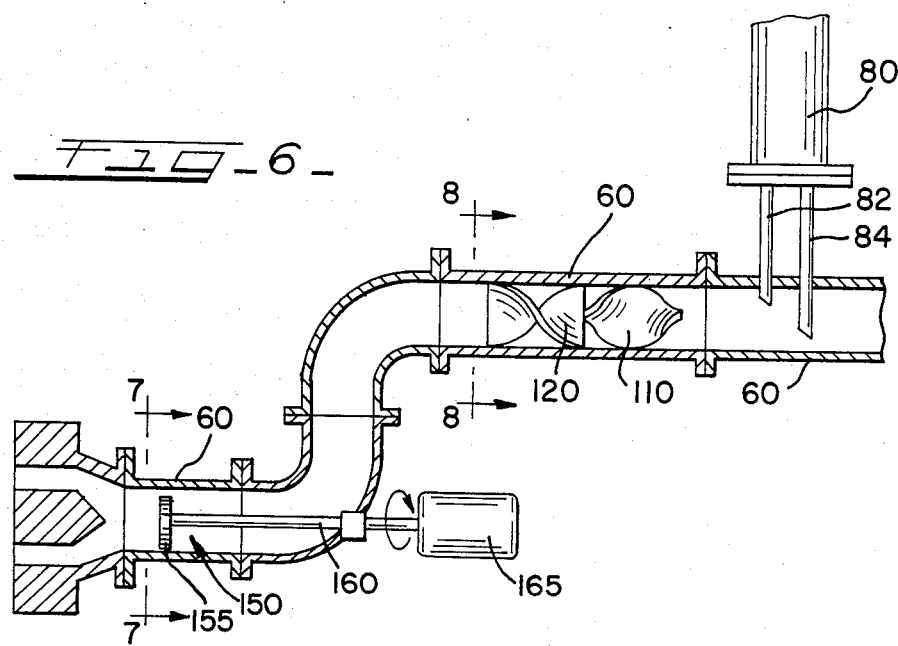
FIG. 6 is an elevational, partially sectional view of an alternative configuration for the apparatus using a moving mixing element.

Referring to FIG. 1, the apparatus has a means 10 for advancing a white pet food stream shown as a screw extruder 20 having a hopper 22 communicating with a passageway 23 defined by a barrel 24 wherein a screw 26 rotatably resides. When a white pet food is placed into the hopper 22 and the screw 26 is rotated by a drive means 28, the white pet food is advanced toward a discharge end 30. As it is advanced toward the discharge end 30, the white pet food is also heated by steam jackets 32 surrounding the barrel 24.

The apparatus also has a means for 35 advancing a red pet food stream shown as a screw extruder 40 having a hopper 42 communicating with a passageway 43 defined by a barrel 44 wherein a screw 46 rotatably resides. When a red pet food is placed into the hopper 42 and the screw 46 is rotated by a drive means 48, the red pet food is advanced toward a discharge end 50. As it is advanced toward the discharge end 50, the red pet food is also heated by steam jackets 52 surrounding the barrel 44.

The means 35 for advancing a red pet food stream, shown as screw extruder 40, communicates through the passageway 43 at the discharge end 50 with a conduit 60 having a circular cross-section at an upstream end 65 of the conduit 60. As a red pet food is discharged in a stream from the extruder 40, it is advanced into the conduit 60 under pressure such that the red pet food stream is molded into the circular, cross-sectional shape of the conduit 60.

Referring to FIGS. 1 and 2, the means 10 for advancing a white pet food stream, shown as a screw extruder 20, communicates through its passageway 23 with a tube 80 at its discharge end 30. The tube 80, in turn, communicates with a plurality of nozzles 82, 84 extending into and terminating medially within the conduit 60. The nozzles 82, 84, in turn, communicate with the conduit 60. As a white pet food is discharged in a stream from the extruder 20, it is advanced through the tube 80, through the nozzles 82, 84 and into medial locations within the conduit 60 and thereby merged with a red pet food stream therein, forming a single, merged pet food stream comprising a white pet food disposed within the red pet food at a plurality of medial locations.

Referring to FIGS. 1 and 3, within the conduit 60 and downstream of the nozzles 82, 84, stationary mixing elements 110, 120, 130, 140 are shown, each of which has means for dividing a pet food stream into two pet food substreams as exemplified by a leading edge 112 extending across the conduit 60, means for partially mixing the respective pet food substreams as exemplified by two helically curved baffle surfaces 114 extending axially and transversely within the conduit 60, and means for discharging the respective pet food substreams into the conduit 60 in a reconsolidated partially mixed pet food stream as exemplified by a trailing edge 116 extending across the conduit 60. As a merged pet food stream is advanced through the conduit 60 it contacts the first stationary mixing element 110 and is divided at the leading edge 112 into two pet food substreams. The respective pet food substreams are then rotated and partially mixed by their contact with the helically curved baffle surfaces 114 and the rounded walls of the conduit 60. The respective pet food substreams are then discharged from the mixing element 110 as it is advanced past the trailing edge 116 and into the conduit 60 in a reconsolidated, partially mixed pet food stream. The partially mixed pet food stream then undergoes additional partial mixing by the other mixing elements 120, 130, 140 shown in FIG. 1.

The conduit 60 also communicates at a downstream end 170 with discharge passages 175 of a shaping die 180 whereby the reconsolidated partially mixed pet food stream is expressed under pressure from the apparatus.

Figure 8:
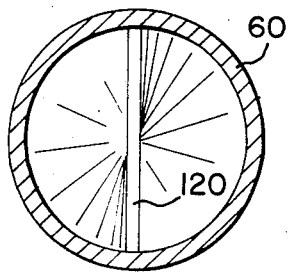
FIG. 8 is a cross-sectional view taken along line 8—8 of FIG. 6.
Figure 7:
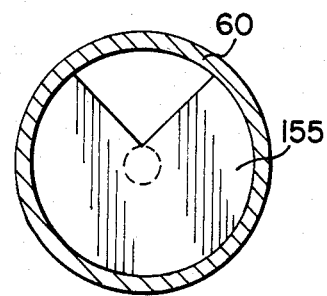
FIG. 7 is a cross-sectional view taken along lines 7—7 of FIG. 6.

Alternative configurations for the invention are also shown in FIGS. 4-8. Referring to FIGS. 4 and 5, additional nozzles 86, 88 can also extend into and terminate medially within the conduit 60. Referring to FIGS. 6, 7 and 8, a moving mixing element 150 can be employed in addition to the stationary mixing elements 110, 120. The configuration of the moving mixing element 150 is shown to be a flat plate 155 having an open sector which is installed across the conduit 60. The plate 155 is attached by a shaft 160 to a drive means 165 which is capable of slowly turning the mixing element 150 within the conduit 60. When a partially mixed pet food stream is advanced into contact with the mixing element 150, the pet food stream is forced through the rotating open sector in the plate 155 and is thereby partially mixed.

DETAILED DESCRIPTION OF THE INVENTION

The present invention employs two pet foods to make a marbled product. The first pet food is a simulated fat which is white in color, and the second pet food is a simulated meat which is red in color. Both the red pet food and white pet food are pet foods that can be comprised of a wide variety of food ingredients including ingredients such as amylaceous material from cereal grains or starch, fats, sugars, meat and meat by-products, proteinaceous material from vegetable and animal sources, vitamins, minerals, and other known nutritional supplements, color, flavoring, plasticizing agents and preservatives. No sticky caseinate binders are required. When the pet foods are combined into a marbled configuration, the product is a semi-moist or dry pet food having a moisture content of less than about 50% by weight and preferably a moisture content of less than about 35% by weight that is soft and palatable and yet is capable of being stored for a long period of time in a non-hermetic package without refrigeration. Such materials typically contain a sufficiently high concentration of solubles to reduce the water activity of the product to a level at which it is microbiologically stable but without sacrificing product softness. Alternatively, a very low moisture in the dry pet food range can be used in these embodiments if plasticizers or softners are used to retain product softness. Such formulations are well known by those skilled in the semi-moist and dry pet food art and therefore no special formulation of ingredients is required for the successful operation of the present invention. Typical formulations for a red pet food and a white pet food to make a marbled semi-moist product are given in Table 1.

TABLE 1

|  | Red | White |
|---|---|---|
| Chicken Parts | 30.00 | — |
| Wheat Feed Flour | 19.75 | 22.65 |
| Soy Protein Concentrate | 16.00 | 17.40 |
| High Fructose Corn Syrup | 15.00 | — |
| Propylene Glycol | 4.65 | 6.51 |
| Animal Fat | 2.50 | 12.00 |
| Dicalcium Phosphate Dihydrate | 1.50 | 1.80 |

TABLE 1-continued

|  | Red | White |
| --- | --- | --- |
| Phosphorice Acid 75% | 1.50 | 1.50 |
| Corn Starch | — | 9.30 |
| Sodium Carboxymethylcellulose | 0.75 | — |
| Salt Iodized | 0.60 | 0.60 |
| D-L Methionine | 0.50 | — |
| Potassium Chloride | 0.40 | 0.40 |
| Potassium Sorbate | 0.175 | 0.245 |
| Sorbic Acid | 0.175 | 0.245 |
| FD & C Red #40 Aluminum Lake | 0.10 | — |
| Titaninium Dioxide | — | 0.75 |
| Water | 5.88 | 26.60 |
| Vitamins & Minerals | 0.52 | — |
| Total | 100.00 | 100.00 |

To successfully simulate marbled meat, the red pet food and white pet food can be merged and mixed in a wide variety of ratios, depending upon the desired final appearance of the marbled product, but ratios in the range of 4:1 to 15:1 are preferred. The most preferred ratio is about 8:1.

The red pet food and the white pet food can be advanced in pet food streams within the apparatus by any known means for advancing similarly viscous materials. Thus, for example, screw extruders 20, 40 or positive displacement pumps can be used. However, screw extruders 20, 40 are preferred since each of the red and white pet food streams can then also be simultaneously heated by steam jackets 32, 52 or other heating means as they are advanced.

Heating the red pet food stream and the white pet food stream to elevated temperatures is preferred to promote flow and mixing in the apparatus and cohesion in the marbled pet food product. Due to the variation in pet food formulations which can be used in the present invention, no particular temperatures are required for the red and white pet food streams but operating temperatures in the range of about 170° F. to about 250° F. are typical for the red pet food stream while operating temperatures in the range of about 190° F. to about 280° F. are typical for the white pet food stream.

The red pet food stream and white pet food stream are merged by advancing them into the conduit 60. Pressures in the conduit 60 where the pet food streams are merged are typically in the range of about 150 psig to about 300 psig but the present invention could operate successfully at pressures as low as about 80 psig. The red pet food stream at these pressures is molded to the circular cross-sectional shape of the conduit 60 as the red pet food stream is advanced into the conduit 60 at the upstream end 65.

The present invention can operate successfully by merging the white pet food stream with the red pet food stream in almost any configuration. For example, the white pet food stream can be advanced into the center of the conduit 60 or at the edge of the conduit 60. It is preferred, however, that the white pet food stream be advanced to a plurality of medial locations within the conduit 60 so that when the white pet food stream is merged with the red pet food stream, a single, merged pet food stream is formed comprising a white pet food disposed within a red pet food at a plurality of medial locations and having a substantially circular cross-section. A "medial location" is a point at which white pet food can be advanced into conduit 60 such that in the merged pet food stream, the white pet food is completely enveloped by the red pet food and not peripheral to the red pet food. A "medial location" is also one in which the white pet food streams be advanced to eccentric locations within the conduit 60 rather than at the geometric center of the conduit 60. Thus, the nozzles 82, 84, 86, 88 shown in FIGS. 1, 2, 4, 5 and 6 reflect preferred medial locations for advancing a white pet food stream into the conduit 60.

The merged pet food stream is then advanced through the conduit and through at least one stationary mixing element. The stationary mixing element or elements can take any configuration which has means for dividing the merged pet food stream into at least two pet food substreams, means for partially mixing the respective pet food substreams and means for discharging the respective pet food substreams into the conduit in a reconsolidated, partially mixed pet food stream. A preferred form is that of the helical mixing elements 110, 120, 130, 140 of FIG. 1 which are located serially within the conduit 60 with the leading and trailing edges of adjacent mixing elements staggered. Also preferred is the transverse relation of nozzles 82, 84 to the first mixing element 110 where a first plane extending axially along the conduit 60 and intersecting the openings of the nozzles 82, 84 is transverse to a second plane extending axially along the conduit and aligned with the leading edge 112 of the first mixing element 110.

The partially mixed pet food stream can also be subjected to mixing in addition to the mixing done by stationary mixing elements by advancing the partially mixed pet food stream through at least one moving mixing element positioned within the conduit 60. For the moving mixing element 150 of FIGS. 6 and 7, rotational speeds of 5 rpm to 20 rpm are preferred.

The partially mixed pet food stream is then expressed through a shaping die. A satisfactory product can be made at pressures measured at the die as low as about 40 psig but pressures in the range of about 50 psig to about 150 psig are preferred operating pressures.

The expressed pet food stream is then cut into pet food pieces, preferably by a knife of conventional design positioned close to the shaping die, and also cooled, if needed, to packaging temperatures below 100° F. and preferably about 80° F.

In a preferred embodiment of the present invention, the red and white pet foods in Table 1 are charged into separate extruders 20, 40. The white pet food is heated in the extruder 20 while it is advanced by the extruder 20 to a temperature in the range of about 190° F. to 280° F. and most preferably to about 250° F. The red pet food is heated in the extruder 40 while it is advanced by the extruder 40 to a temperature in the range of about 170° F. to 250° F. and most preferably to about 200° F. The red pet food stream is discharged from the extruder 40 and advanced into the conduit 60 and the white pet food stream is discharged from the extruder 20 and advanced into and through nozzles 82, 84 and merged within the red pet food stream in two medial locations. The red pet food stream and the white pet food stream are thereby merged at a pressure of about 150 psig to about 300 psig and most preferably at about 200 psig in a ratio in the range of about 4:1 to about 15:1 and most preferably about 8:1. The merged pet food stream is then advanced into contact with a plurality of helical stationary mixing elements 110, 120, 130, 140. Typically two, three or four stationary mixing elements are used depending upon the formulation used and the rate of pet food flow through the mixing elements. The partially mixed pet food stream is then expressed through a shaping die 180 at a pressure in the range of about 50 psig to about 150 psig and most preferably at about 100 psig. The expressed pet food stream is then cut into pet food pieces by a knife positioned close to the shaping die and the resulting pet food pieces are transferred on a belt conveyor to a cool air stream and cooled to packaging temperatures in the range of about 80° F. to about 100° F.

The following examples illustrate and explain the present invention but are not to be taken as limiting the invention in any regard.

EXAMPLE 1

The ingredients for the white pet food listed in Table 1 were mixed in a Sigma blade mixer and were charged into a first Bonnot screw extruder (Bonnot Company, Kent, Ohio) 20 at a rate of about 500 lbs./hr. The ingredients for the red pet food listed in Table 1 were mixed in a Sigma blade mixer and were charged into a second Bonnot screw extruder 40 at a rate of about 4000 lbs./hr. The screw of the first extruder 20 was driven at a rotational speed of about 15 rpm. The white pet food was heated in the first extruder 20 to a temperature of about 250° F. The screw of the second extruder 40 was driven at a rotational speed of about 50 rpm. The red pet food was heated in the second extruder 40 to a temperature of about 200° F. The white pet food was advanced from the extruder 20 in a stream through the tube 80 comprising a 2" Teflon lined pipe and also through nozzles 82, 84 comprising two ¾" pipes which extended medially into the conduit 60. The conduit 60 consisted of sections of 4" diameter pipe with a circular cross-section. The red pet food was advanced in stream into an upstream end 65 of the conduit 60 and merged with the white pet food stream at a ratio of about 8:1 and at a pressure of about 200 psig. The merged red and white pet foods were then advanced through two helical stationary mixing elements 110, 120 made by Kenics Corporation, North Andover, Mass. which were fitted snugly within the conduit. The marbled pet food stream was then expressed through a shaping die 180 comprising rectangular Teflon discharge passageways enclosed by a steel casing. A rotating blade cutter then cut the expressed pet food stream into pet food pieces. The pet food pieces dropped onto a high speed belt conveyor which brought them to a cool air stream that cooled them to about 80° F. The resulting product was found to have high appeal when fed to dogs, had a good marbled meat appearance, and was low in cost.

EXAMPLE 2

As in Example 1, the white and red pet foods were charged into the extruders 20, 40 at respective rates of 500 lbs./hr. and 4000 lbs./hr. and were processed under conditions identical to Example 1 by the apparatus to form a partially mixed pet food stream. The partially mixed pet foods stream was then advanced through a moving mixing element 150 having a 4" plate 155 with a quarter section removed which was mounted on a 1" diameter shaft 160 and installed across the conduit 60. The moving mixing element 150 was rotated at about 7 rpm which further mixed the pet food stream. The partially mixed pet food stream was then expressed through a shaping die 180 and was cut, cooled and packaged under the same conditions as in Example 1. The resulting product had highly random marbling resembling raw meat.

Although the above description and examples of the invention are disclosed herein for the purpose of describing the invention to those with ordinary skill in the art, it is not intended that each and every modification and variation of the invention should be described in detail. It is intended, however, that all obvious modifications and variations are to be included within the scope of the invention.

I claim:

1. A method for continuously making a marbled semi-moist or dry pet food comprising the steps of:
    (a) merging a red pet food stream with a white pet food stream by (i) advancing the red pet food stream under a first pressure into a conduit having a substantially circular cross section, said first pressure being sufficient to mold the red pet food stream into the shape of the conduit, and (ii) advancing the white pet food stream into a plurality of medial locations within said conduit to combine the white pet food stream with the red pet food stream into a single, merged pet food stream comprising a white pet food disposed within a red pet food at a plurality of medial locations, said merged pet food stream having a substantially circular cross-section;
    (b) partially mixing the merged pet food stream by advancing the merged pet food stream through the conduit and through at least one stationary mixing element having means for dividing the merged pet food stream into at least two pet food substreams, said element also having means for partially mixing the respective pet food substreams, and said element also having means for discharging the respective pet food substreams into the conduit in a reconsolidated, partially mixed pet food strea; thereby dividing the merged pet food stream into at least two pet food substreams, partially mixing the respective pet food substreams and discharging the respective pet food substreams into the conduit in a reconsolidated, partially mixed pet food stream;
    (c) expressing the reconsolidated partially mixed pet food stream through a shaping die at a second pressure above about 40 psig; and
    (d) cutting the expressed pet food stream into pet food pieces.

2. The method of claim 1 further comprising the step of heating the red pet food stream to a temperature of about 170° F. to about 250° F. prior to merging it with the white pet food stream.

3. The method of claim 1 further comprising the step of heating the white pet food stream to a temperature of about 190° F. to about 280° F. prior to merging it with the red pet food stream.

4. The method of claim 1 wherein the second pressure, at which the partially mixed pet food stream is expressed, is between about 50 psig and about 150 psig.

5. The method of claim 1 further comprising the step of advancing the partially mixed pet food stream through at least one moving mixing element.

6. The method of claim 1 wherein the red pet food stream and the white pet food stream are merged in the ratio of about 4:1 to about 15:1 by weight.

7. The method of claim 1 further comprising the step of cooking the red pet food stream in a screw extruder prior to merging it with the white pet food stream.

8. The method of claim 1 further comprising the step of cooking the white pet food stream in a screw extruder prior to merging it with the red pet food stream.

9. The method of claim 1 further comprising the step of cooling the pet food pieces to a temperature below about 100° F.

* * * * *